UNITED STATES PATENT OFFICE.

JEAN M. O. TAMIN, OF NEW YORK, N. Y.

IMPROVEMENT IN THE MANUFACTURE OF CHOCOLATE.

Specification forming part of Letters Patent No. 141,832, dated August 12, 1873; application filed June 23, 1873.

*To all whom it may concern:*

Be it known that I, Dr. JEAN MARIE ONESIME TAMIN, of the city, county, and State of New York, have invented certain Improvements in the Manufacture of Chocolate, of which the following is a specification:

This invention has for its object to improve the value of chocolate as an article of food by adding thereto certain matter for increasing its digestibility. The matter added is tea, either in the ordinary state of decoction, or essence, or in the form of theine.

For one pound of chocolate I usually use ten grammes of tea, and find by experiment that the addition of the stimulant named will make the chocolate necessarily more easily digestible, and will also improve its flavor.

The chocolate to be compounded with the tea is formed in a pasty condition into cakes or pieces of suitable size and shape, after or while the substance named has been mixed therewith, and is then used in the same manner in which chocolate is now used.

In conjunction with the tea I may also use, for the purpose of still further increasing the digestibility and improving the flavor of the chocolate, cacao, or the essence thereof, and also coffee in the form of a decoction, essence, cafeine, or both cacao and coffee.

If I use coffee and cacao, or either, together with the tea and chocolate, the amount of tea used is reduced in the proportion in which the other substance or substances named are added.

What I claim as my invention is—

In the manufacture of chocolate into cakes or pieces, the combination therewith of tea, substantially as described.

J. M. O. TAMIN.

Witnesses:
    A. V. BRIESEN,
    F. V. BRIESEN.